Nov. 20, 1956     T. F. CARMICHAEL     2,771,102
VIBRATORY ELECTRIC CUTTING TOOL
Filed Aug. 24, 1950
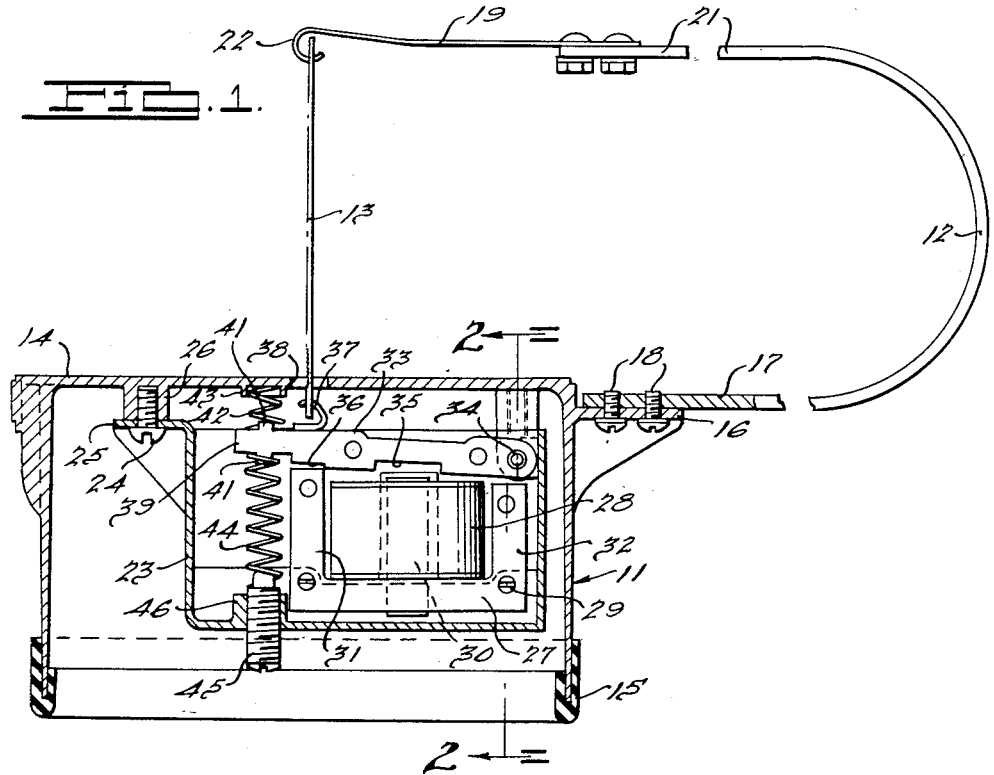
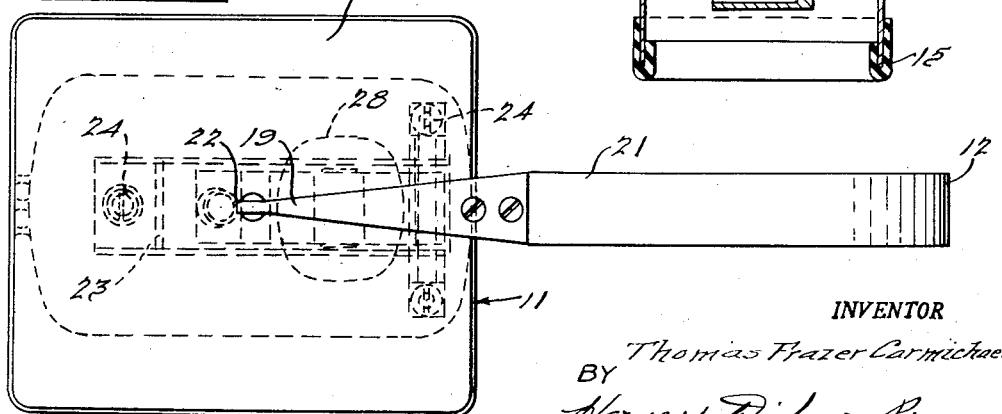
INVENTOR
Thomas Frazer Carmichael
BY
Harness, Dickey & Pierce
ATTORNEYS.

United States Patent Office 2,771,102
Patented Nov. 20, 1956

2,771,102

VIBRATORY ELECTRIC CUTTING TOOL

Thomas Frazer Carmichael, Plymouth, Mich., assignor to Syncro Corporation, Oxford, Mich., a corporation of Michigan Application August 24, 1950, Serial No. 181,272

1 Claim. (Cl. 143—73)

This invention relates to electric tools and more particularly to scroll or jig saws which are actuated by means of a vibratory electric motor.

It is an object of the present invention to provide an electrically operated jig saw which is extremely efficient in operation and in which the vibrational characteristics of the driving mechanism are such as to increase the power and durability of the stroke under all types of working conditions.

It is another object to provide a jig saw which is compact in its arrangement of parts and which has an exceedingly simple and inexpensive structure achieving at the same time a highly efficient operation. In particularly, it is within the contemplation of this invention to provide a magnetically operated jig saw having an armature driven by a pulsating electromagnet, the armature being provided with novel spring means which give the armature frequency characteristics such as to supply the saw blade with a maximum work effort when it is most needed, and to further maintain the length and strength of stroke for various work loads.

Other objects of the invention will become apparent from the following specification, the drawings relating thereto, and from the claim hereinafter set forth.

In the drawings;

Figure 1 is a side elevational view, partly in cross-section, showing the arrangement of parts in the jig saw, Fig. 2 is a cross-sectional view, taken along the line 2—2 of Fig. 1 and with the blade removed, showing the relation of the vibratory motor to the remainder of the device, and Fig. 3 is a top plan view of the Fig. 2, showing the shape of the table and associated parts.

The scroll or jig saw shown in the figures is of the table or bench type, although it will be understood that the principles of this invention are likewise applicable to other types of jig saws and similar tools. The saw comprises in general an open-bottom base or housing 11 which supports the driving elements of the tool, a yoke 12 mounted on the base and supporting at its upper end saw or other cutting blade 13, the blade being held taut at its lower end by the driving mechanism. The top of housing 11 is provided with a plane work table 14 for supporting the work, and the housing preferably has a non-metallic foot 15 mounted on its bottom edge for engagement with a stationary support. A bracket 16 is provided at the rear of the casing 11 and the lower arm 17 of yoke 12 is secured to this bracket by means of bolts 18. The yoke 12 is preferably of stiff construction and generally goose-necked shape, and a resilient tool carrier such as the tapered leaf-spring member 19 is secured to and extends from the outer end of upper yoke arm 21, the carrier having a hooked portion 22 for supporting the upper end of blade 13.

The driving means for the tool is preferably mounted within the confines of housing 11 and is supported by a supporting bracket 23. The bracket is suspended below the top surface 14 of housing 11 by means of bolts 24 which are engageable with flanges 25 at the upper edge of bracket and threadably mounted in tapped bosses 26 extending downwardly from the underside of table 14. An electromagnet comprising a conventional E-shaped core 27 of laminated plates and a wire coil 28 is mounted within bracket 23 by means of bolts 29. Core 27 has a center pole piece 30 extending vertically within the coil 28 and two outer pole pieces 31 and 32 extending parallel to pole pieces 30. The coil 28 is adapted to be connected by means of a switch (not shown) to a standard source of alternating or pulsating current.

Pivotally mounted immediately above the electromagnet is an elongated armature 33. This armature, which may also be constructed of laminated sections, is connected to bracket 23 by means of a pivot pin 34 which extends through one end of the armature adjacent pole piece 32. To accommodate the pole pieces, the armature 33 is provided with a notched portion 35 adjacent pole piece 30, and another notched portion 36 adjacent pole piece 31, which is of slightly greater length than pole piece 32. The upper surface of the armature is provided with with a hook member 37 in substantially vertical alignment with pole piece 31, the hook being engageable with the lower end of saw blade 13. An apertured portion 38 is provided on table surface 14 to allow the saw blade to pass therethrough.

The outer end 39 of armature 33 extends substantially beyond pole piece 31 and is provided with a pair of lugs 41 on its upper and lower surfaces respectively. A first or upper coil spring 42 is disposed between the outer end 39 of the armature and underside of table 14, and is retained in position by upper lug 41 and an annular retaining ring 43 integral with the undersurface of the table. A second or lower coil spring 44 of substantially greater length than spring 42 is disposed beneath the armature and in substantial alignment with coil spring 42. The lower spring 44 is engageable at its upper end with the outer extension 39 of the armature, being held in position by lower lug 41. The lower end of spring 44 is supported by an adjusting or set screw 45 which is threadably mounted in a vertically disposed boss 46 in the lower end of bracket 23. It will be seen, especially from an examination of Fig. 1, that the arrangement of springs 42 and 44, as well as the dimensions of the blade 13 and its supports, are such that when the armature is in its neutral position it will have a slight but definite inclination with respect to the electromagnet and to table surface 14, the inclination being upwardly away from pivot pin 34. It will also be obvious that when a source of alternating or pulsating current is connected to coil 28, the armature will be subjected to an intermittent attractive force from the electromagnet which will result in a vibratory movement to and from the table 14 at a frequency twice that of the power source.

The purpose of springs 42 and 44 is to improve the vibrational characteristics of the armature and its associated parts so as to achieve the highest power output and durability of stroke for saw blade 13 when it is engaged with the work. It will be seen that since springs 42 and 44 are engageable with the outer end 39 of the armature, their natural frequency and spring constant characteristics will play an important role in controlling the natural frequency of the armature 33 and of the vibrating system as a whole. It has also been found that the relative natural frequencies of the springs 42 and 44 themselves, as well as the relation between their spring constants, also have a decided effect on the efficiency of the tool. These characteristics can be controlled both by choosing the proper sizes, strengths and frequencies of springs 42 and 44, as well as adjusting set screw 45 after the device is assembled, the adjustment of the latter simultaneously effecting the compression of both springs. In particular, it has been found that in order to achieve optimum results the difference in natural frequencies between springs 42 and 44 should be not less than 10% and not more than 92% of the forced or armature frequency which if the tool is supplied with 60 cycle current would be 120 cycles per second. In addition, it has been found that the spring scales of the two springs should differ from each other by not less than 10% and not more than 20% in order to achieve the most efficient results.

The operation of the tool will be apparent from the above description. Upon supplying alternating or pulsating currents to the coil 28, pulsating fluxes will be set up which, as previously described, will impart a reciprocatory movement to the armature and give a corresponding vertical movement to saw blade 13. It will be observed that the maximum force in the saw blade will occur during its downward movement, and since in normal operation the teeth of the blade face downwardly, this will result in maximum effort being applied during the cutting stroke of the blade. It will also be noted that due to the angularity of the armature 33 with relation to the table surface 14 the saw blade 13 will receive a slight transverse movement into the work (to the left, as seen in Fig. 1) when the armature moves downwardly, thus given a slight "biting" action to the blade. On the other hand, when the armature is moving upwardly the blade will move slightly to the right (as seen in Fig. 1) thus allowing the teeth to be withdrawn slightly from the work and diminishing the force necessary on the upward stroke.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claim.

What is claimed is:

In a cutting tool, a housing having a work table thereon, means for resting said housing on a stationary support, a blade support mounted on said housing and having a portion spaced above said table, a cutting blade supported at its upper end by said support and extending through said table, an electromagnet comprising a coil and a core mounted within said housing, said core having a plurality of spaced poles, an armature of rigid construction disposed between said electromagnet and said table and mounted for vibratory movement to and from said table about a fixed pivotal axis adjacent one of said poles, the lower end of said blade being operatively connected to said armature, the armature being inclined upwardly from said pivotal connection toward said table, whereby operative movement of said armature will impart a slight transverse component of movement to said blade, an upper coil spring having its upper end abutting the undersurface of said table and its lower end engageable with said armature so as to aid the attractive force of said electromagnet, and a lower coil spring aligned with said upper spring and having its upper end engageable with said armature so as to oppose said attractive force, said springs being laterally spaced from said electromagnet poles whereby the operative surfaces of said poles are uninterrupted.

References Cited in the file of this patent

UNITED STATES PATENTS

| | | |
|---|---|---|
| 985,547 | Pryce | Feb. 28, 1911 |
| 1,891,486 | Wahl | Dec. 20, 1932 |
| 2,072,590 | Lowry | Mar. 2, 1937 |
| 2,233,862 | Dremel | Mar. 4, 1941 |
| 2,238,390 | Knopp | Apr. 15, 1941 |
| 2,247,052 | Dalkowitz | June 24, 1941 |
| 2,283,551 | Hanley | May 19, 1942 |
| 2,351,623 | Martin | June 20, 1944 |

FOREIGN PATENTS

| | | |
|---|---|---|
| 971,317 | France | July 5, 1950 |